(12) United States Patent
Pinschmidt et al.

(10) Patent No.: US 11,059,364 B2
(45) Date of Patent: *Jul. 13, 2021

(54) DRIVE DEVICE FOR A VEHICLE AXLE OF A TWO-TRACK VEHICLE

(71) Applicant: AUDI AG, Ingolstadt (DE)

(72) Inventors: Udo Pinschmidt, Gaimersheim (DE); Steffen Hummel, Bergen (DE); Christian Wirth, Moosinning / Eichenried (DE)

(73) Assignee: AUDI AG, Ingolstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/649,316

(22) PCT Filed: Oct. 18, 2018

(86) PCT No.: PCT/EP2018/078615
§ 371 (c)(1),
(2) Date: Mar. 20, 2020

(87) PCT Pub. No.: WO2019/091747
PCT Pub. Date: May 16, 2019

(65) Prior Publication Data
US 2020/0262289 A1    Aug. 20, 2020

(30) Foreign Application Priority Data
Nov. 13, 2017 (DE) .................... 10 2017 220 171.1

(51) Int. Cl.
*B60K 6/365* (2007.10)
*B60K 6/24* (2007.10)
(Continued)

(52) U.S. Cl.
CPC ............... *B60K 6/365* (2013.01); *B60K 6/24* (2013.01); *B60K 6/26* (2013.01); *B60K 17/16* (2013.01);
(Continued)

(58) Field of Classification Search
None
See application file for complete search history.

(56) References Cited

U.S. PATENT DOCUMENTS 9,221,335 B2 * 12/2015 Wirth .................... F16H 48/06
10,400,877 B2 * 9/2019 Pinschmidt .......... B60W 10/08
(Continued)

FOREIGN PATENT DOCUMENTS

DE    102009049856 A1    4/2011
DE    102010036240 A1    3/2012
(Continued)

OTHER PUBLICATIONS

Examination Report dated Jul. 31, 2018 in corresponding German application No. 10 2017 220 171.1; 10 pages including Machine-generated English-language translation.
(Continued)

*Primary Examiner* — Dirk Wright
(74) *Attorney, Agent, or Firm* — Maier & Maier, PLLC

(57) ABSTRACT

A drive device for a vehicle axle, especially a rear axle, of a two-track vehicle, wherein the vehicle axle comprises an axle differential, which can be connected at the primary end to a primary drive machine and can be connected at the output end across flange shafts arranged on either side to vehicle wheels of the vehicle axle, wherein the vehicle axle is associated with an additional drive machine and a shiftable superimposing gear, which can be shifted to a torque distribution gear in which a drive torque is generated by the additional drive machine, depending on the magnitude and (Continued)

direction of rotation of which a torque distribution on the two vehicle wheels can be changed, and shifted to a hybrid mode in which the drive torque generated by the additional drive machine can be coupled to both flange shafts of the vehicle wheels, evenly distributed across the axle differential.

20 Claims, 4 Drawing Sheets

(51) Int. Cl.
    *B60K 6/26*     (2007.10)
    *B60K 17/16*     (2006.01)
    *F16H 3/72*     (2006.01)
    *F16H 37/08*     (2006.01)

(52) U.S. Cl.
    CPC ......... *F16H 3/724* (2013.01); *F16H 37/0806* (2013.01); *B60Y 2200/92* (2013.01); *F16H 2200/0013* (2013.01); *F16H 2200/0021* (2013.01); *F16H 2200/201* (2013.01); *F16H 2200/2012* (2013.01); *F16H 2200/2038* (2013.01)

(56) References Cited

U.S. PATENT DOCUMENTS

| | | | | |
|---|---|---|---|---|
| 2016/0003337 A1* | 1/2016 | Smetana | ................ | F16H 48/05 475/5 |
| 2020/0271208 A1* | 8/2020 | Pinschmidt | .............. | B60K 6/26 |
| 2020/0276897 A1* | 9/2020 | Pinschmidt | .............. | F16H 48/36 |
| 2020/0317041 A1* | 10/2020 | Pinschmidt | .............. | B60K 6/48 |

FOREIGN PATENT DOCUMENTS

| | | |
|---|---|---|
| DE | 102013202381 A1 | 8/2014 |
| DE | 102014210549 A1 | 12/2015 |
| DE | 102014015793 A1 | 4/2016 |
| DE | 102015104778 A1 | 9/2016 |

OTHER PUBLICATIONS

Examination Report dated Dec. 9, 2018 in corresponding German application No. 10 2017 220 171.1; 8 pages including Machine-generated English-language translation.
Examination Report dated May 20, 2019 in corresponding German application No. 10 2017 220 171.1; 8 pages including Machine-generated English-language translation.
International Search Report dated Jan. 22, 2019 and Written Opinion in corresponding application No. PCT/EP2018/078615; 21 pages.
International Preliminary Report on Patentability and the Written Opinion of the International Searching Authority dated May 19, 2020, in connection with corresponding international Application No. PCT/EP2018/078615 (10 pgs.).

\* cited by examiner

DRIVE DEVICE FOR A VEHICLE AXLE OF A TWO-TRACK VEHICLE

FIELD

A drive device for a vehicle axle, especially a rear axle, of a two-track vehicle.

BACKGROUND

From DE 10 2014 015 793 A1 there is known a drive device of this kind for a vehicle rear axle comprising an axle differential, which can be connected at the input end to a primary drive machine (such as an internal combustion engine) and can be connected at the output end to flange shafts arranged on either side with vehicle wheels of the vehicle axle. The vehicle axle is associated with an additional drive machine (especially an electric motor) and a shiftable superimposing gear. The superimposing gear can be shifted to a torque distribution gear in which a drive torque can be generated by the additional drive machine, depending on the magnitude and direction of rotation of which a torque distribution on the two vehicle wheels can be changed. Alternatively, the superimposing gear can be shifted to a hybrid mode in which the drive torque generated by the additional drive machine can be coupled to both flange shafts of the vehicle wheels, evenly distributed across the axle differential. In certain driving situations, for example when negotiating a curve, the driving performance when the torque distributions gear is engaged can be assisted by a torque redistribution (torque vectoring or cross lock function). Thus, when negotiating a curve, a drive torque when entering the curve can be shifted to the outer wheel of the vehicle on the curve (torque vectoring). Alternatively or additionally, when negotiating a curve, the drive torque when exiting the curve can be shifted to the inner wheel of the vehicle on the curve (cross lock function). On the other hand, a boost function can occur, for example, when hybrid mode is activated.

In the cited DE 10 2014 015 793 A1, the superimposing gear comprises a total of three planetary gearings, which can be shifted by means of two brakes in order to provide the hybrid mode or the torque distribution mode, resulting in a design space-intensive arrangement on the whole.

SUMMARY

The problem which the invention proposes to solve is to provide a drive device for a vehicle axle of a two-track vehicle having reduced design space as compared to the prior art, and enabling a function expansion/reduction with simple means, namely, with less design space requirement and with enhanced driving dynamics.

The problem is solved by the features of claim 1. Preferred modifications of the invention are disclosed in the dependent claims.

According to the disclosure, the three planetary gearings in the superimposing gear are coupled together such that a load path with power branching is formed when the torque distribution gear is engaged or when a first hybrid gear is en-gaged, in which precisely two of the planetary gearings are incorporated. On the contrary, when a second hybrid gear is engaged, a load path is formed without power branching, in which only precisely one of the planetary gearings is integrated. In this way, different gear ratios can be easily realized in the first hybrid gear and in the second hybrid gear.

In one technical embodiment, the three planetary gearings can be arranged in a row, coaxially to the flange shaft. The first planetary gearing at the input end can be rotationally fixed by its input element, especially a sun gear, to a transmission input shaft driven by the additional drive machine. Furthermore, the first planetary gearing at the input end can be connected by its output element, especially a planet carrier carrying planet gears, to a transmission output shaft, which is coupled in driving manner to the input end of the axle differential (for a differential drive). The reaction element of the first planetary gearing at the input end, especially a radially outer ring gear meshing with the planet gears, can be locked by a shift element SH2 on the gearbox housing or released from it, depending on the shift position of the shift element SH2.

In this case, in the second hybrid gear the ring gear can be locked by the shift element SH2 on the gearbox housing, so that a drive torque flow or load path is produced without power branching from the additional drive machine (electric machine) across the first planetary gearing at the input end to the input end of the axle differential, while the second and third planetary gearing are decoupled from the load path.

In regard to a torque transformation, it is preferable when the additional drive machine is coupled across a reduction stage to the transmission input shaft. For design space reasons, the additional drive machine can preferably be arranged axially parallel to the flange shaft, and the reduction stage can be for example a single-stage spur gear.

In one specific design variant, the ring gear of the first planetary gearing at the input end and a ring gear of the second planetary gearing can be rotationally fixed on a common, radially outer ring gear shaft. The radially outer ring gear shaft can be locked by the already mentioned shift element SH2 on the gearbox housing.

The ring gear shaft can be rotationally fixed by a ring gear flange to an intermediate shaft. The intermediate shaft can additionally carry a rotationally fixed braking flange, which can be locked by the hybrid shift element SH2 to the gearbox housing.

The ring gear of the second planetary gearing can mesh with planet gears which are rotatably mounted on a planet carrier and which mesh in turn with a radially inner sun gear, which can be locked as a reaction element to the gearbox housing or can be released from it, this being done by a torque distributions shift element STV. Preferably, the sun gear can be rotationally fixed to a sun gear shaft. The sun gear shaft can additionally carry a rotationally fixed braking flange, which can be locked by the torque distribution shift element STV to the gearbox housing.

Furthermore, the planet carrier of the second planetary gearing may comprise a torque distribution output flange, which is rotationally fixed on a torque distribution shaft leading to the axle differential. When the torque distribution gear is engaged, the following constellation results with the above gearing structure: thus, in this case, the sun gear of the second planetary gearing is locked by the torque distribution shift element to the gearbox housing. This produces a load path from the additional drive machine to the first planetary gearing, on whose planet carrier a power branching occurs. Accordingly, a first partial load path goes onward to the transmission output shaft and to the input end of the axle differential. A second partial load path, on the other hand, goes across the planet gears and the ring gear of the first planetary gearing to the ring gear shaft and to the second planetary gearing, and from here it goes across the torque distribution flange to the torque distribution shaft.

In one technical implementation, the axle differential may comprise a Ravigneaux set, in which planet gears of a first planet gear set mesh with both a radially outer ring gear, forming the input end of the axle differential, and with planet gears of a second planet gear set. Furthermore, the planet gears of the first planet gear are in tooth engagement with a first, major sun gear, while the planet gears of the second planet gear set mesh with a second, minor sun gear. The two planet gear sets are rotatably mounted on a common planet carrier. In the specific embodiment, the first, major sun gear can be rotationally fixed on the torque distribution output shaft coming from the transmission gear, while the second, minor sun gear is rotationally fixed on the one flange shaft (at the gearing side) and the common planet carrier is rotationally fixed on the other flange shaft (away from the gearing).

The third planetary gearing is free turning both when the first torque distribution gear TV is engaged and when the second hybrid gear is engaged, that is, it is decoupled from the respective load path and only incorporated in the load path when the first hybrid gear is engaged. The third planetary gearing comprises a sun gear, which is rotationally fixed on the already mentioned intermediate shaft, and this together with the ring gear flange and the braking flange, which interacts with the second hybrid shift element SH2. The sun gear of the third planetary gearing meshes with planet gears which are rotatably mounted on a planet carrier and are in toothed engagement with a radially outer ring gear. The planet carrier of the third planetary gearing can be locked by a hybrid shift element HS1 on the gearbox housing, or released from it. The ring gear of the third planetary gearing can be rotationally fixed across a connecting shaft to the planet carrier of the first planetary gearing.

Hence, when the first hybrid gear H1 is engaged, the following constellation results: the planet carrier of the third planetary gearing is locked by means of the hybrid shift element HS1 on the gearbox housing. This produces a load path from the additional drive machine to the first planetary gearing, on whose planet carrier a power distribution occurs, during which a main load path goes onward to the transmission output shaft and to the input end of the axle differential. A secondary load path, on the other hand, goes across the planet gears and across the ring gear of the first planetary gearing to the ring gear shaft and further across the ring gear flange and the intermediate shaft to the third planetary gearing. From its ring gear, the secondary load path returns across the connecting shaft to the planet carrier of the first planetary gearing.

In regard to a package optimization, it is preferable for the transmission output shaft to comprise an outer shaft portion, bounding a radially internal design space. In the design space, the first and the second planetary gearing can be preferably situated. Furthermore, in regard to a package optimization, it is preferable for the second planetary gearing to be situated vehicle-inward and the third planetary gearing to be situated vehicle-outward, especially looking in the vehicle transverse direction, while the first planetary gearing is situated between the second and third planetary gearing.

In regard to a further package optimization, it is preferable for the intermediate shaft carrying the planet carrier of the first planetary gearing to be realized as a hollow shaft. In this case, the transmission input shaft, the intermediate shaft and connecting shaft, as well as the flange shaft at the gearing side, configured as hollow shafts, can be arranged coaxially nested in one another.

Likewise, the transmission output shaft can be formed as an outer hollow shaft. In this case, the transmission output shaft, the torque distribution output shaft formed as an inner hollow shaft, and the flange shaft at the gearing side may be arranged coaxially nested in one another.

BRIEF DESCRIPTION OF THE DRAWINGS

An exemplary embodiment of the invention is described below with the aid of the enclosed figures.

There are Shown.

DETAILED DESCRIPTION

Figure 1:
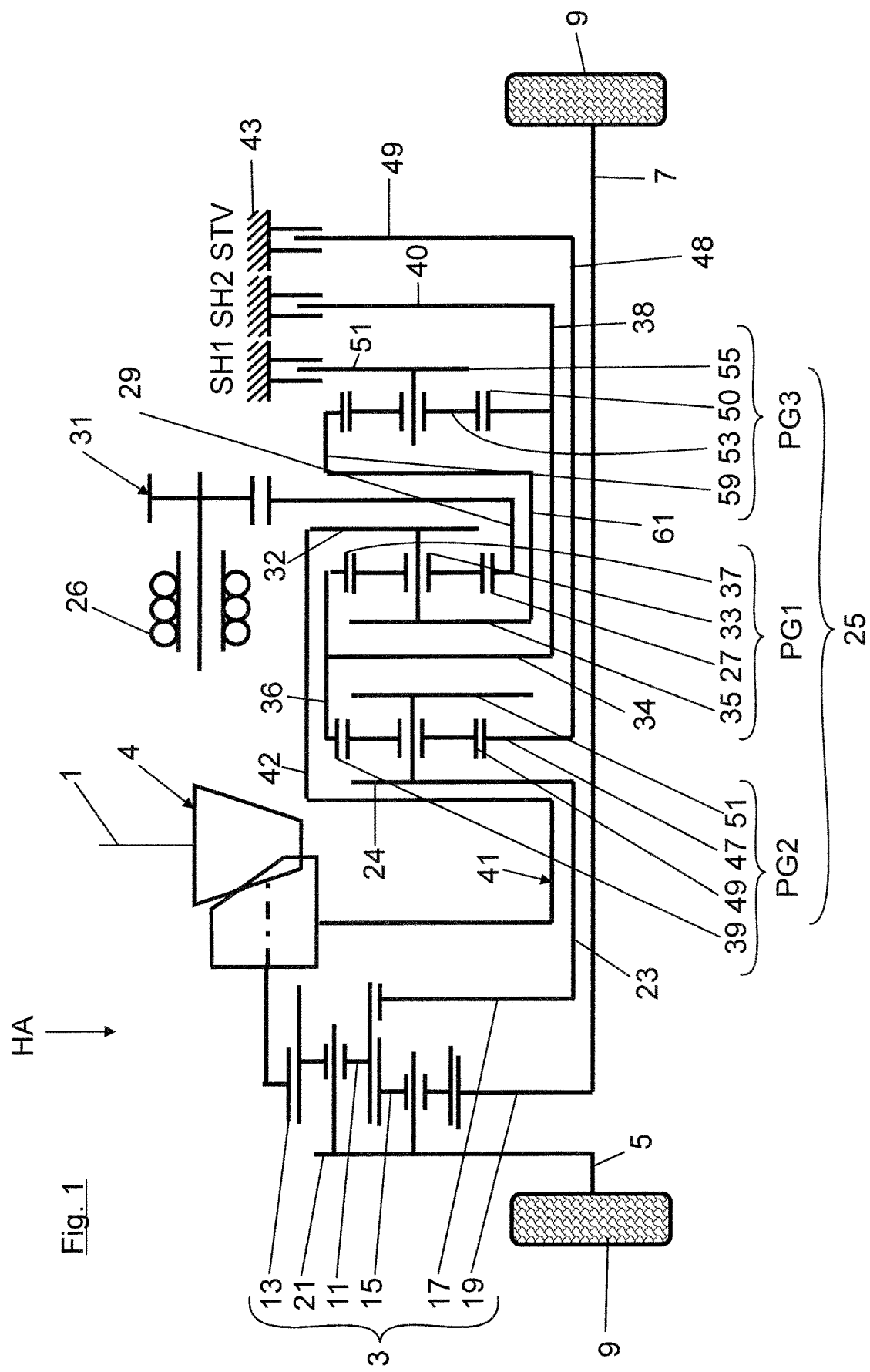
FIG. 1 in a schematic representation, a drive device for a vehicle rear axle of a two-track vehicle.

FIG. 1 shows, roughly schematically, a gearing structure of a drive device for a vehicle rear axle HA of a two-track vehicle. The drive device shown in FIG. 1 may be part of an all-wheel drive, in which a front-end internal combustion engine (not shown) as the primary drive machine drives the front wheels of the vehicle across a transmission as well as a central differential and a front axle differential. The central differential can be connected in driving manner across a Cardan shaft and across a bevel gear 4 to the input end 13 of a rear axle differential 3. Between the bevel gear 4 and the input end 13 of the rear axle differential 3 there is connected a clutch K, by which the rear axle HA can be decoupled from the drive of the Cardan shaft.

The rear axle differential 3 is coupled at its output, in driving manner, to the rear wheels 9 of the vehicle's rear axle HA across flange shafts 5, 7 arranged on both sides. In FIG. 1, the rear axle differential 3 is a planetary differential with a Ravigneaux gear set, in which planet gears 11 of a first planet gear set mesh with both a radially outer ring gear 13, forming the input end of the axle differential 3, and also with planet gears 15 of a second planet gear set. Furthermore, the planet gears 11 of the first planet gear set are in toothed engagement with a first, major sun gear 17. The planet gears 15 of the second planet gear set, on the other hand, are in toothed engagement with a second, minor sun gear 19. Both planet gear sets are rotatably mounted on a common planet carrier 21, which is rotationally fixed on a flange shaft 5 away from the gearing. On the other hand, the second, minor sun gear 19 is rotationally fixed on the flange shaft 7 at the gearing side, while the first, major sun gear 17 is rotationally fixed on a torque distribution output shaft 23, leading to the superimposing gear 25.

The rear axle HA comprises an already mentioned superimposing gear 25 as well as an electric machine 26. The superimposing gear 25 can be operated in a hybrid mode or in a torque distribution mode (that is, electronic torque vectoring or cross lock function), as will be described later on. In the hybrid mode, a drive torque generated by the electric machine 26 is coupled, evenly distributed across the superimposing gear 25 and the rear axle differential 3, to both flange shafts 5, 7. The hybrid mode can be implemented as a pure electric motor or in combination of the electric machine 26 with the internal combustion engine (for example for a boost function).

In the torque distribution mode, the drive torque generated by the electric machine 26 is taken not only to the input end (ring gear 13) of the axle differential 3, but also across the superimposing gear 25 to the first, major sun gear 17 of the axle differential 3, in order to change a torque distribution on the two rear wheels 9. The channeling to the first, major sun gear 17 occurs across a torque distribution flange 24 of the superimposing gear 25, mounted on the torque distribution output shaft 23. The torque distribution between the vehicle wheels 9 will occur according to the magnitude and the rotary direction of the drive torque generated by the electric machine 26.

In the following, the gearing structure of the superimposing gear 25 will be explained with the aid of FIG. 1: accordingly, the superimposing gear 25 comprises a first planetary gearing PG1 at the input end, a second planetary gearing PG2, and a third planetary gearing PG3, which are arranged immediately next to each other in the vehicle transverse direction y and coaxially oriented on the flange shaft 7 at the gearing side. The middle, first planetary gearing PG1 is rotationally fixed by its sun gear 27 (acting as an input element) to a transmission input shaft 29, which is driven at the electric machine 26. As its output element, the first planetary gearing PG1 has a planet carrier 35, carrying planet gears 33. The planet carrier 35 is rotationally fixed across a hybrid output flange 32 to the transmission output shaft 41. This, in turn, is coupled in driving manner to the input end 13 of the axle differential 3. As a reaction element, the first planetary gearing PG1 comprises a ring gear 37, meshing with the planet gears 33. The ring gear 37 of the first planetary gearing PG1 at the input end and a ring gear 39 of the second planetary gearing PG2 are mounted on a common, radially outer ring gear shaft 36. This is rotationally fixed across a ring gear flange 34 to an intermediate shaft 38. The intermediate shaft 38 additionally carries a braking flange 40, which can be locked by a hybrid shift element SH2 on the gearbox housing 43.

In the second planetary gearing PG2, the ring gear 39 meshes with planet gears 49 which are rotatably mounted on a planet carrier 51 and which furthermore mesh with a sun gear 47. The sun gear 47 of the second planetary gearing PG2 is rotationally fixed on a sun gear shaft 48. This additionally carries a braking flange 49, which can be locked by a torque distribution shift element STV to the gearbox housing 43. The planet carrier 51 of the second planetary gearing PG2 furthermore comprises a torque distribution output flange 24, which is rotationally fixed on the torque distribution shaft 23 leading to the axle differential 3.

The third planetary gearing PG3 comprises a sun gear 50, which is rotationally fixed on the intermediate shaft 38 and meshes with planet gears 53 which are rotatably mounted on a planet carrier 55. The planet gears 53 are in toothed engagement with a radially outer ring gear 59, which is rotationally fixed across a connecting shaft 61 to the planet carrier 35 of the first planetary gearing PG1.

Figure 2:
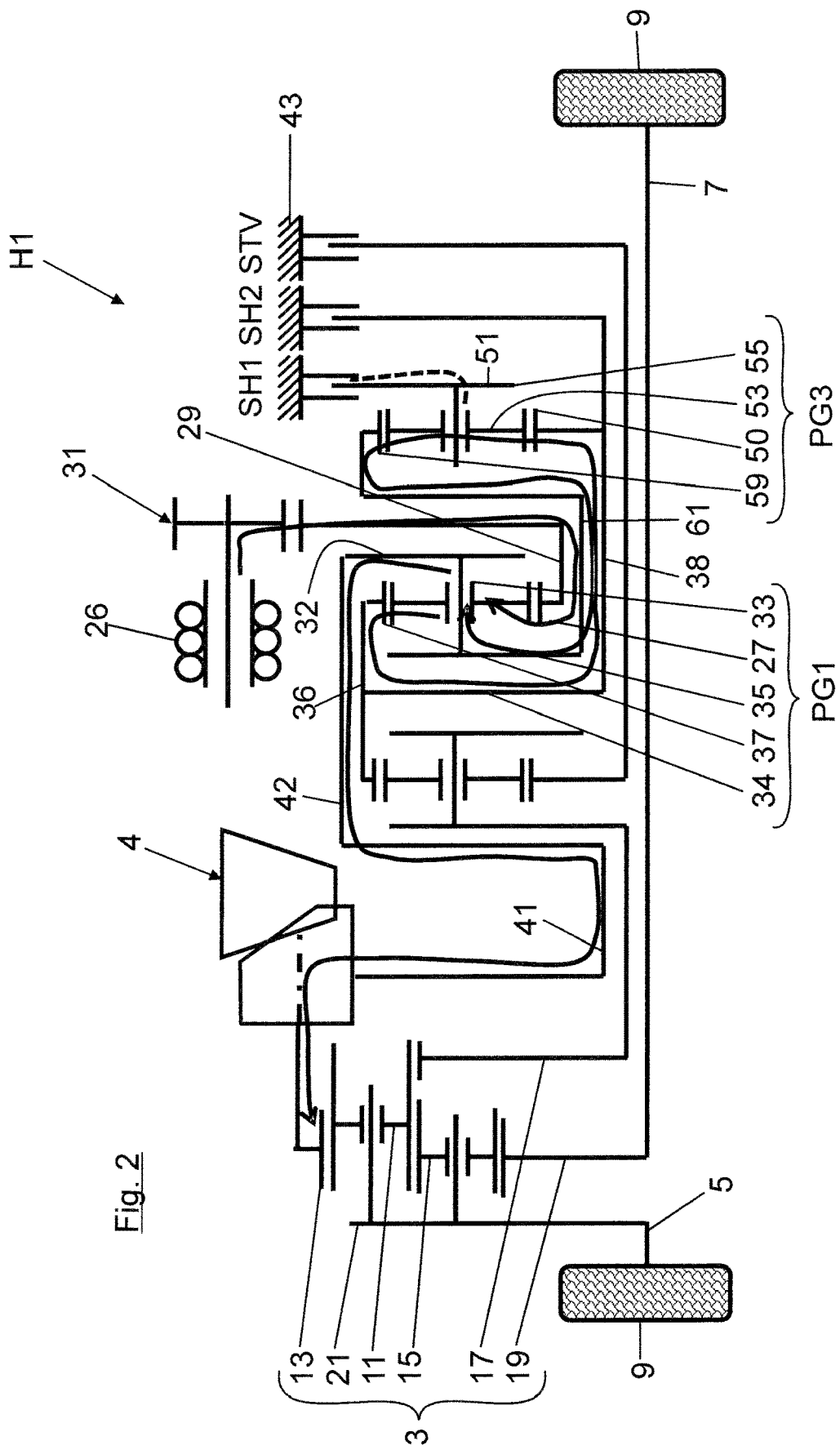
FIG. 2 respective view corresponding to FIG. 1 with high-lighted drive torque flow with the first hybrid gear engaged.

In order to explain the functioning of the drive device, a driving situation will be described with the aid of FIG. 2, in which a first hybrid gear H1 is engaged. In this case, the planet carrier 55 of the third planetary gearing PG3 will be locked by means of the hybrid shift element HS1 on the gearbox housing 43. This produces a load path from the electric machine 26 to the first planetary gearing PG1, on whose planet carrier 35 a power distribution will occur. A main load path will go onward, across the hybrid output flange 32, to the transmission output shaft 41 and to the input end 13 of the axle differential. A secondary load path will go across the planet gears 33, the ring gear 37 of the first planetary gearing PG1, the ring gear shaft 36 and the ring gear flange 34 across the intermediate shaft 38 to the third planetary gearing PG3 and from its ring gear 59 across the connecting shaft 61 back to the planet carrier 35 of the first planetary gearing PG1. In FIG. 2 (and also in FIGS. 3 and 4), the load paths are indicated by solid line, while lost power paths, carrying a reactive power, are indicated by dot and dash line.

Figure 3:
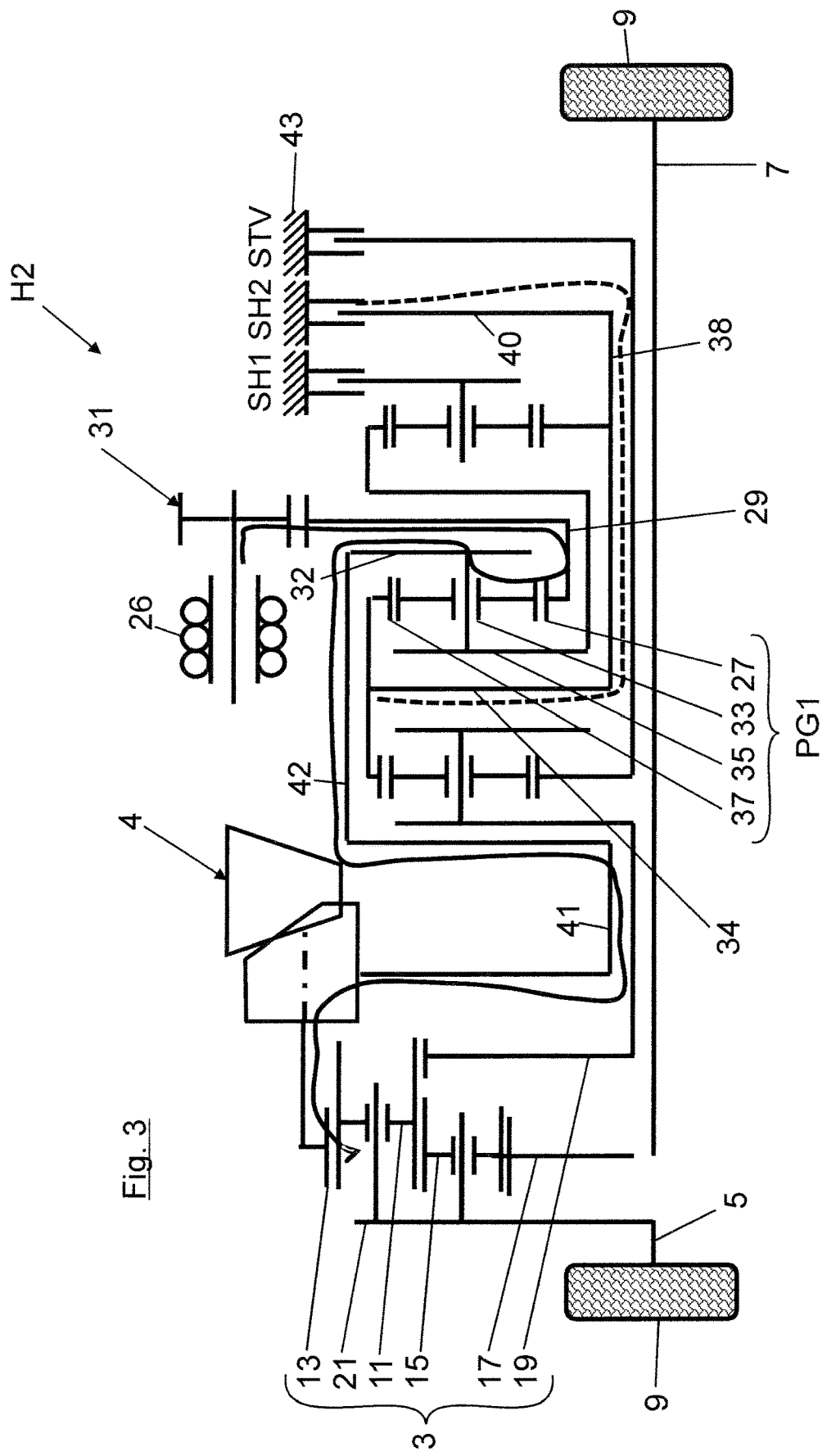
FIG. 3 respective view corresponding to FIG. 1 with high-lighted drive torque flow with the second hybrid gear engaged.

FIG. 3 shows another driving situation, in which the second hybrid gear H2 is engaged, contrary to FIG. 2. In this case, the ring gear 37 of the first planetary gearing PG1 is locked by the shift element SH2 on the gearbox housing 43. This produces a load path from the electric machine 26 across the first planetary gearing PG1 at the input end and its hybrid output flange 32 to the input end 13 of the axle differential 3.

Figure 4:
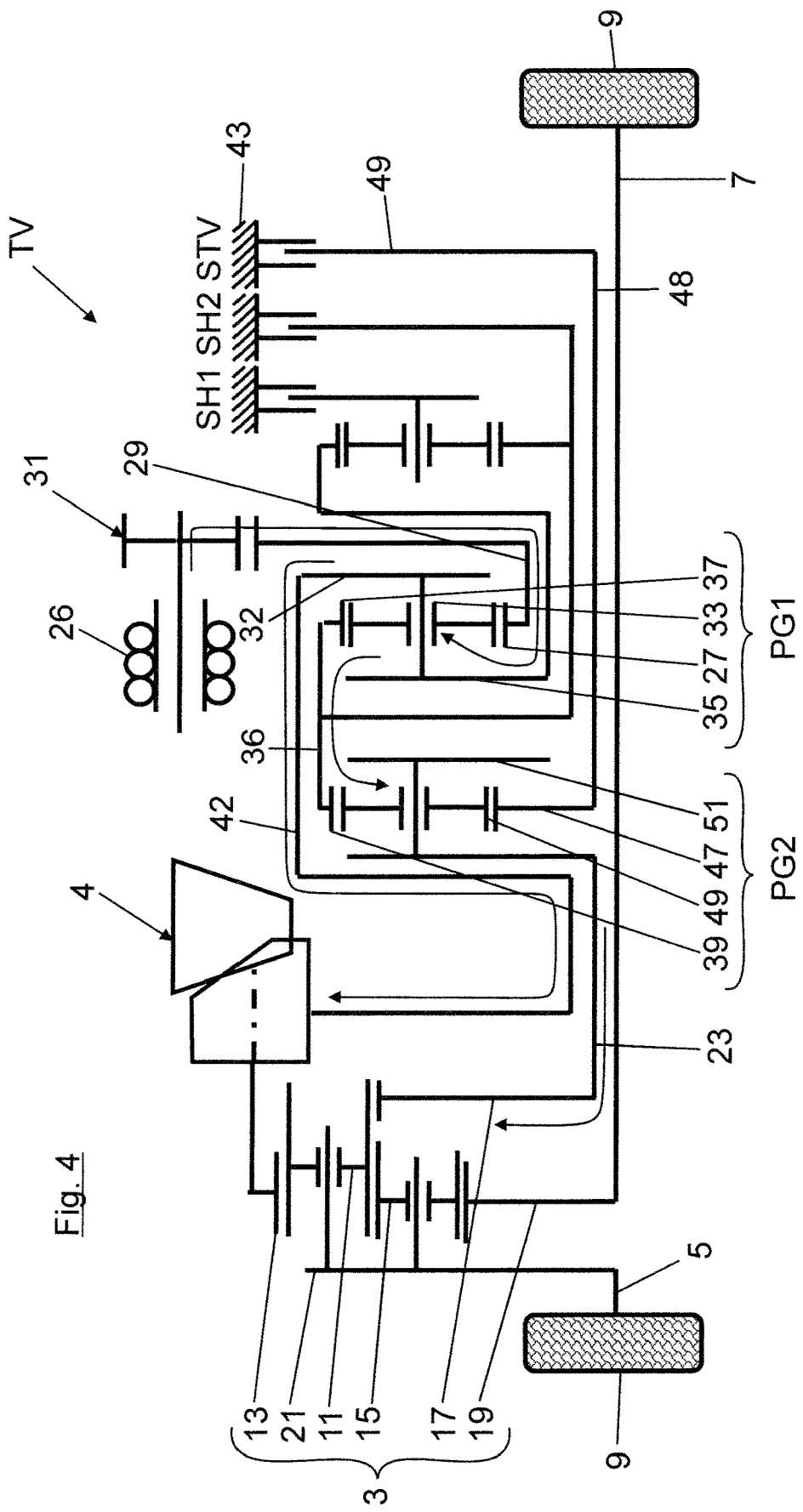
FIG. 4 respective view corresponding to FIG. 1 with high-lighted drive torque flow with the torque distribution gear engaged.

FIG. 4 shows a driving situation in which the torque distribution gear TV is engaged. The torque distribution mode is activated, for example, when negotiating a curve, in order to accomplish a torque difference between the flange shafts 5, 7. In the torque distribution mode, the two hybrid shift elements HS1, SH2 are released, while the torque distribution shift element STV is engaged, by means of which the sun gear 47 of the second planetary gearing PG2 is locked on the gearbox housing 43. This produces a load path from the electric machine 26 to the first planetary gearing PG1, on whose planet carrier 35 a power distribution will occur. A first partial load path goes across the hybrid output flange 32 onward to the transmission output shaft 41 and to the input end 13 of the axle differential. A second partial load path goes across the planet gears 33 and the ring gear 37 of the first planetary gearing PG1 and across the ring gear shaft 36 to the second planetary gearing PG2. From here, the partial load path goes across the torque distribution flange 24 to the torque distribution shaft 23 and on to the first, major sun gear 17 of the axle differential 3. The direction of turning and the magnitude of the drive torque generated by the electric machine 26 are designed so that a torque is fed into the first planet gear set of the axle differential 3 or removed from it, so that a torque distribution between the two flange shafts 5, 7 is changed.

The drive device according to the invention has the following benefits: the desired gear ratios can be easily implemented. An increment between the hybrid gears is limited to relatively small values in the case of the same stationary gear ratios. However, by increasing the stationary gear ratios of a gear set, the first hybrid gear gang can be made shorter. It should be pointed out in particular that the hybrid shift elements SH1, SH2 and the torque distribution shift element STV are all designed as brakes. Furthermore, the direction of turning of the electric machine 26 does not change between the first and second hybrid gears. The efficiencies in the hybrid gears are higher than in comparable designs of the prior art (thanks to no reactive power). Furthermore, a customary Ravigneaux set can be used according to the invention.

The invention claimed is:

1. A drive device for a vehicle axle of a two-track vehicle, wherein the vehicle axle comprises:
    an axle differential, which is connected at an input end to a primary drive machine and is connected at an output end across flange shafts arranged on either side to vehicle wheels of the vehicle axle,
    wherein the vehicle axle corresponds to an additional drive machine and a shiftable superimposing gear, which is shiftable to a torque distribution mode in which a drive torque is generated by the additional drive machine, depending on the magnitude and direction of rotation of which a torque distribution on the two vehicle wheels is changeable, and shifted to a hybrid mode in which the drive torque generated by the additional drive machine is coupled to both flange shafts of the vehicle wheels, evenly distributed across the axle differential, wherein the superimposing gear further comprises three planetary gearings which are coupled together, and in that a load path is formed in the superimposing gear when the torque distribution mode is engaged and when a first hybrid mode is engaged in which precisely two of the planetary gearings are incorporated, and wherein, when a second hybrid mode is engaged, a load path is formed in the superimposing gear in which only precisely one of the planetary gearings is incorporated.

2. The drive device according to claim 1, wherein the three planetary gearings are arranged in a row, co-axially to the flange shaft, and in that a first planetary gearing at the input end is rotationally fixed by its input element, a sun gear, to a transmission input shaft driven by the additional drive machine, and is connected by its output element, a planet carrier carrying planet gears, across a hybrid output flange to a trans-mission output shaft, which is coupled in driving manner to the input end of the axle differential, and in that a reaction element of the first planetary gearing, a ring gear meshing with the planet gears, is lockable to or releasable from a gearbox housing by a shift element.

3. The drive device according to claim 2, wherein in the second hybrid gear, the ring gear of the first planetary gearing is locked by the shift element on the gearbox housing, so that a load path is produced from the additional drive machine across the first planetary gearing at the input end to the input end of the axle differential.

4. The drive device according to claim 1, wherein the additional drive machine is coupled across a reduction stage for the torque transformation to the transmission input shaft by a single-stage spur gear, or the additional drive machine is arranged axially parallel to the flange shaft.

5. The drive device according to claim 2, wherein the ring gear of the first planetary gearing at the input end and a ring gear of the second planetary gearing are rotationally fixed on a common, radially outer ring gear shaft, which is lockable by the shift element on the gearbox housing, and in that the ring gear shaft is rotationally fixed by a ring gear flange to an intermediate shaft, and in that the intermediate shaft additionally carries a rotationally fixed braking flange, which is lockable by the hybrid shift element to the gearbox housing.

6. The drive device according to claim 5, wherein in the second planetary gearing, the ring gear meshes with planet gears which are rotatably mounted on a planet carrier and which mesh with a sun gear, which is lockable by a torque distribution shift element to the gear-box housing or releasable from it, and in that the sun gear is rotationally fixed to a sun gear shaft, and in that the sun gear shaft additionally carries a rotationally fixed braking flange, which is lockable by the torque distribution shift element to the gearbox housing.

7. The drive device according to claim 6, wherein the planet carrier of the second planetary gearing comprises a torque distribution output flange, which is rotationally fixed to a torque distribution shaft leading to the axle differential.

8. The drive device according to claim 2, wherein the axle differential comprises a Ravigneaux set, in which planet gears of a first planet gear set mesh with both a radially outer ring gear, forming the input end of the axle differential, with planet gears of a second planet gear set, respectively, and with a first, major sun gear, and in that the planet gears of the second planet gear set mesh with a second, minor sun gear, the two planet gear sets being rotatably mounted on a common planet carrier, and in that the first, major sun gear is rotation-ally fixed on the torque distribution output shaft, the second, minor sun gear is rotationally fixed on the one flange shaft and the common planet carrier is rotationally fixed on the other flange shaft.

9. The drive device according to claim 7, wherein, when the torque distribution gear is engaged, the sun gear of the second planetary gearing is locked by the torque distribution shift element to the gearbox housing, so that a load path is produced from the additional drive machine to the first planetary gearing, on the planet carrier of which a power distribution occurs, during which a first partial load path continues across the hybrid output flange to the transmission output shaft up to the input end of the axle differential, and a second partial load path continues across the planet gears and the ring gear of the first planetary gearing and the ring gear shaft to the second planetary gearing and from here it is continued across the torque distribution flange to the torque distribution shaft.

10. The drive device according to claim 2, wherein the third planetary gearing comprises a sun gear, which is rotationally fixed on the intermediate shaft and meshes with planet gears which are rotatably mounted on a planet carrier, wherein the planet gears are in toothed engagement with a radially outer ring gear, and in that the planet carrier of the third planetary gearing comprises a braking flange, which is lockable by a hybrid shift element on the gearbox housing, and in that the ring gear of the third planetary gearing is rotationally fixed across a connecting shaft to the planet carrier of the first planetary gearing.

11. The drive device according to claim 10, wherein, in a first hybrid gear, the planet carrier of the third planetary gearing is locked by the hybrid shift element on the gearbox housing, so that a load path is produced from the additional drive machine to the first planetary gearing, on the planet carrier of which a power distribution occurs, during which a main load path continues from the hybrid output flange on to the transmission output shaft and up to the input end of the axle differential, and a secondary load path continues across the planet gears and the ring gear of the first planetary gearing and the ring gear shaft to the third planetary gearing and is returned from its ring gear across the connecting shaft to the planet carrier of the first planetary gearing.

12. The drive device according to claim 6, wherein the transmission output shaft comprises an outer shaft portion, bounding a radially internal design space in which the first and the second planetary gearing are situated, or in that the second planetary gearing is situated vehicle-inward and the third planetary gearing is situated vehicle-outward looking in the vehicle trans-verse direction while the first planetary gearing is situated between the second and third planetary gearing.

13. The drive device according to claim 10, wherein the transmission input shaft, formed as an inner hollow shaft, as well as the connecting shaft carrying the planet carrier of the first planetary gearing, the intermediate shaft, and the flange shaft at the gearing side are arranged coaxially nested in one another.

14. The drive device according to claim 6, wherein the transmission output shaft is formed as an outer hollow shaft, and in that the transmission output shaft, the torque distribution output shaft are arranged as an inner hollow shaft, and the flange shaft at the gearing side is arranged coaxially nested in one another.

15. The drive device according to claim 2, wherein the additional drive machine is coupled across a reduction stage for the torque transformation to the transmission input shaft by a single-stage spur gear, or the additional drive machine is arranged axially parallel to the flange shaft.

16. The drive device according to claim 3, wherein the additional drive machine is coupled across a reduction stage for the torque transformation to the transmission input shaft by a single-stage spur gear, or the additional drive machine is arranged axially parallel to the flange shaft.

17. The drive device according to claim 3, wherein the ring gear of the first planetary gearing at the input end and a ring gear of the second planetary gearing are rotationally fixed on a common, radially outer ring gear shaft, which is lockable by the shift element on the gearbox housing, and in that the ring gear shaft is rotationally fixed by a ring gear flange to an intermediate shaft, and in that the intermediate shaft additionally carries a rotationally fixed braking flange, which is lockable by the hybrid shift element to the gearbox housing.

18. The drive device according to claim 4, wherein the ring gear of the first planetary gearing at the input end and a ring gear of the second planetary gearing are rotationally fixed on a common, radially outer ring gear shaft, which is lockable by the shift element on the gearbox housing, and in that the ring gear shaft is rotationally fixed by a ring gear flange to an intermediate shaft, and in that the intermediate shaft additionally carries a rotationally fixed braking flange, which is lockable by the hybrid shift element to the gearbox housing.

19. The drive device according to claim 8, wherein, when the torque distribution gear is engaged, the sun gear of the second planetary gearing is locked by the torque distribution shift element to the gearbox housing, so that a load path is produced from the additional drive machine to the first planetary gearing, on the planet carrier of which a power distribution occurs, during which a first partial load path continues across the hybrid output flange to the transmission output shaft up to the input end of the axle differential, and a second partial load path continues across the planet gears and the ring gear of the first planetary gearing and the ring gear shaft to the second planetary gearing and from here it is continued across the torque distribution flange to the torque distribution shaft.

20. The drive device according to claim 3, wherein the third planetary gearing comprises a sun gear, which is rotationally fixed on the intermediate shaft and meshes with planet gears which are rotatably mounted on a planet carrier, wherein the planet gears are in toothed engagement with a radially outer ring gear, and in that the planet carrier of the third planetary gearing comprises a braking flange, which is lockable by a hybrid shift element on the gearbox housing, and in that the ring gear of the third planetary gearing is rotationally fixed across a connecting shaft to the planet carrier of the first planetary gearing.

* * * * *